(12) United States Patent
MacBain et al.

(10) Patent No.: US 10,487,874 B2
(45) Date of Patent: Nov. 26, 2019

(54) NON-LINEAR BEARING RELEASE FOR LARGE MOVEABLE STRUCTURES

(71) Applicant: Geiger Gossen Campbell Engineers P.C., Suffern, NY (US)

(72) Inventors: Keith MacBain, Washingtonville, NY (US); Timothy Mills, Nyack, NY (US); David Campbell, Suffern, NY (US)

(73) Assignee: GEIGER GOSSEN CAMPBELL ENGINEERS P.C., Suffern, NY (US)

( * ) Notice: Subject to any disclaimer, the term of this patent is extended or adjusted under 35 U.S.C. 154(b) by 0 days.

(21) Appl. No.: 15/689,830

(22) Filed: Aug. 29, 2017

(65) Prior Publication Data

US 2018/0058500 A1      Mar. 1, 2018

Related U.S. Application Data

(60) Provisional application No. 62/381,953, filed on Aug. 31, 2016.

(51) Int. Cl.
| | | |
|---|---|---|
| *E04H 3/14* | (2006.01) | |
| *E04H 3/10* | (2006.01) | |
| *F16C 29/02* | (2006.01) | |
| *E04B 7/16* | (2006.01) | |
| *E04H 3/16* | (2006.01) | |
| *E04H 3/26* | (2006.01) | |

(52) U.S. Cl.
CPC .............. *F16C 29/02* (2013.01); *E04B 7/166* (2013.01); *E04H 3/14* (2013.01); *E04H 3/10* (2013.01); *E04H 3/165* (2013.01); *E04H 3/26* (2013.01)

(58) Field of Classification Search
CPC .... E04H 3/26; E04H 3/28; E04H 3/30; E04H 3/10; E04H 3/165; E04H 3/14; E04H 2003/142; E04H 2003/145; F16C 29/02; E04B 7/166
USPC .................................................. 52/7, 6, 9, 10
See application file for complete search history.

(56) References Cited

U.S. PATENT DOCUMENTS

| | | | | |
|---|---|---|---|---|
| 1,819,656 | A * | 8/1931 | Pressley ..................... | A63J 1/00 108/139 |
| 3,213,571 | A * | 10/1965 | Olson ....................... | E04H 3/00 49/362 |

(Continued)

FOREIGN PATENT DOCUMENTS

| | | |
|---|---|---|
| JP | H 06272348 | 9/1994 |
| JP | H 11247347 | 9/1999 |
| JP | 2001248259 | 9/2001 |

OTHER PUBLICATIONS

Kazuo Ishii, Retractable Roof Structure, 1988.

(Continued)

*Primary Examiner* — Phi D A
(74) *Attorney, Agent, or Firm* — Venable LLP (57) ABSTRACT

A release mechanism for a transport carriage used to move an elongated beam or truss is constructed using a non-linear bearing mounted on the carriage and connected to the truss and including upper and lower bearing mounting surfaces having complementary arcuate surfaces and a layer of layers of lower friction bearing material between them. The upper and lower bearing mounting surfaces being arranged to allow one plate to move relative to the other in an arcuate path in the direction of the space of the beam or truss.

31 Claims, 11 Drawing Sheets

(56) References Cited

U.S. PATENT DOCUMENTS

| | | | |
|---|---|---|---|
| 4,727,688 A * | 3/1988 | Kida | E04B 7/166 |
| | | | 52/6 |
| 4,751,800 A | 6/1988 | Kida | |
| 4,831,792 A | 5/1989 | Berger | |
| 5,117,594 A * | 6/1992 | Muramoto | E04B 1/34305 |
| | | | 52/6 |
| 5,257,481 A | 11/1993 | Reppas | |
| 5,845,434 A * | 12/1998 | Hayashi | E04H 3/22 |
| | | | 52/9 |
| 5,896,708 A * | 4/1999 | Doi | E04B 7/166 |
| | | | 52/66 |
| 6,065,252 A * | 5/2000 | Norsen | E04H 15/20 |
| | | | 52/2.11 |
| 6,415,556 B1 | 7/2002 | Silberman | |
| 6,789,360 B2 * | 9/2004 | Silberman | E04B 7/166 |
| | | | 52/6 |
| 6,851,227 B1 | 2/2005 | Schildge | |
| 8,033,060 B2 * | 10/2011 | Parker | E04B 7/08 |
| | | | 220/252 |
| 2013/0333302 A1 * | 12/2013 | Valente | E04H 3/123 |
| | | | 52/7 |

OTHER PUBLICATIONS

Michael Barnes, Widespan Roof Structures, 2000.
Modern Steel Construction, Arizona Diamondbacks Ball Park, 1999.
Otet, Design and Construction of the Millennium Stadium, 2007, Figs. 12-14.

\* cited by examiner

NON-LINEAR BEARING RELEASE FOR LARGE MOVEABLE STRUCTURES

This application claims the benefit of U.S. Provisional Application No. 62/381,953 filed Aug. 31, 2016.

BACKGROUND OF THE INVENTION

Field of the Invention

The present invention relates to a moveable support for a large moveable structure such as a retractable stadium roof or an overhead crane and the like. More particularly the moveable support includes a non-linear arcuate bearing which allows the structure to release stress in the structure resulting from thermal expansion or contraction, wind loads and the like. This non-linear arcuate bearing permits the design engineer to tailor the response of the structure in a way that is not possible with conventional linear bearings constrained to one direction of motion.

Background of the Invention

It is common practice in the design of large moveable structures such as overhead cranes, moveable roofs, bridges and the like to provide for horizontal release of external stresses on the structure caused from thermal expansion or contraction due to temperature changes and the like which create internal stresses in the structure and otherwise interfere with movement of the structure. Typically, this release is provided by a linear bearing which allows for the motion caused by thermal expansion or contraction between the ends of the structure to be released in a straight line transverse to the direction of motion of the structure. Release of the horizontal motion in this way does not attract or cause forces in the support structure which are difficult to resist and would impede movement. Linear release bearings consisting of pivot type pin or guide shaft slidably mounted in a surrounding collar and secured, between one end of a beam or truss and a fixed support structure to allow the beam or truss to expand or contract longitudinally relative to the fixed support structure have been used for decades in the building of large overhead cranes. They have been adapted for the same purpose to support structures of moveable stadium roofs, as disclosed in U.S. Pat. No. 7,594,360. Other analogous linear release mechanisms include rack arid pinion devices as disclosed in U.S. Pat. No. 5,896,708 to Doi and flat linear slides plates as disclosed in U.S. Pat. No. 6,851,227.

When a linear bearing is used in conjunction with a rotational release (e.g., a wheel on a rail which allows the supported structure to move along the rail or the rotatable structure used in U.S. Pat. No. 5,896,708) there are two primary movements that can occur (a.k.a. degrees of freedom, DOF). These are translation and rotation. In general, translation and rotation will occur together, however it is instructive to consider them independently in understanding the behavior of the supported structure, be it a truss or a beam, and the advantages of the present invention.

Figure 1:
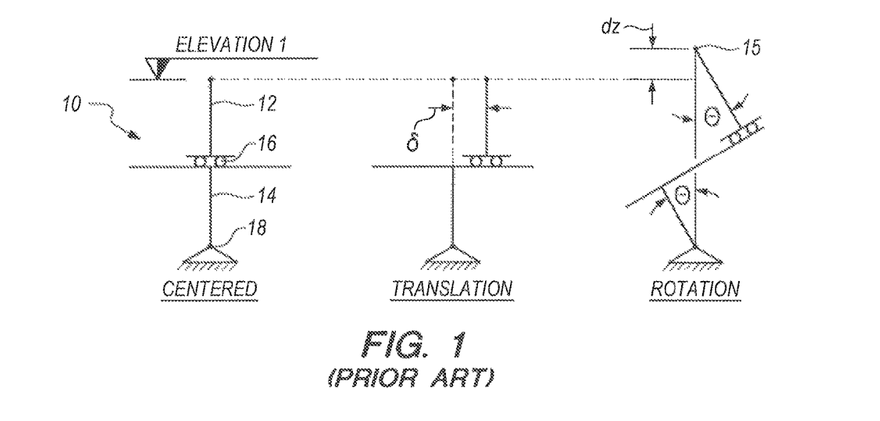
FIG. 1 is a schematic view as described above of a conventional linear bearing used in a support carriage for one end of an overhead crane or moveable roof support structure, illustrating the motions in such structures resulting from internal and external stresses.

A linear bearing in conjunction with a rotational release is illustrated schematically in FIG. 1 along with these two degrees of freedom.

That Figure illustrates a carriage or bogie 10 such as might be used to support one end of a retractable roof truss. The bogie has upper and lower carriage body elements or structures 12, 14 which have a linear bearing 16 between them to allow relative movement in the left/right direction (in FIG. 1) in a straight line. The schematically illustrated bearing is of the type shown in the Doi patent but could be a simple cylindrical bearing as in U.S. Pat. No. 7,594,360. Upper carriage body element 12 is connected to and supports one end of a beam or truss (not shown) which spans a large space and which lies along the page in the direction of the horizontal motion. The lower carriage body element 14 is supported on a wheel or wheels riding on a rail (schematically illustrated as a pin support 18) which allows the carriage to be moved with the beam or truss along the rail/pin support 18 perpendicularly to the truss, into and out of the page.

The center illustration of FIG. 1 shows the permitted horizontal release provided by the linear bearing. However it is noted that for a linear bearing rotation of the carriage assembly on the rail or pin support 18 causes a change in the position or inclination of the upper and lower carriage elements relative to the horizontal. When that rotational motion occurs in conjunction with a horizontal translation, the net change in elevation or inclination of the carriage elements and the location of the point of connection 15 of the upper element 12 to the supported truss may be larger or smaller (depending on the direction; this is illustrated by the dimension dz in the right most illustration of FIG. 1). This rotational motion will create undesired stresses in the structure. There is no parameter in a linear bearing that allows the designer to alter or control this change in elevation for any given combination of rotation and displacement.

OBJECTS OF THE INVENTION

It is an object of this invention to provide a release mechanism for a beam, truss or other support structure which accommodates both rotation and displacement thereby avoiding the deficiencies of the prior art.

Another object of the invention is to provide a release mechanism which permits the design engineer to tailor the response of a large longitudinal support structure to internally developed stresses in a way that is not possible with a linear bearing constrained to one direction of motion.

Yet another object of the invention is to provide a release bearing mechanism which releases stresses in a supported structure in both translation and rotation which is relatively simple in its structure and assembly.

A still further object of the invention is provide an improved lateral release mechanism for large structural members.

SUMMARY OF THE INVENTION

In accordance with an aspect of the, present invention a support carriage or bogie for a large structural member is provided with a non-linear bearing that allows for motion in a non-linear path. The non-linear path in the preferred embodiment is generally the arc of a circle. The non-linear bearing, when used with a support that allows a degree of rotation like a pin support or rail, gives the desired releases, however due to the non-linearity of the bearing, the kinematic relations are different from those of a simple linear bearing, as described below.

In accordance with another aspect of the invention a release mechanism for a transport carriage of a moveable structural member spanning a large space has upper and lower bearing mounting plates formed with generally complementary arcuate surfaces and a low friction bearing layer or layers between them. One of the plates is secured to the moveable structural member and the other is secured to a frame structure of the carriage which is used to move the end of the structural member in a direction transverse to its span. The plates are arranged to allow the plate connected to the structural member to move, relative to the plate connected to the carriage frame structure, in an arcuate path in the direction of the span of the structural member.

In accordance with yet another aspect of the invention the above described bearing mounting plates are convex or concave.

In accordance with a further aspect of the invention the release mechanism includes an integrated uplift assembly which prevents the bearing mounting plates from separating in a vertical direction from one another without interfering with the non-linear release of the mounting plates to accommodate stress in the structural member.

The above and other objects, features and advantages of the present invention will be apparent to those skilled in the art from the following detailed description of illustrative embodiments thereof when read in conjunction with the accompanying, drawings, wherein:

BRIEF DESCRIPTION OF THE DRAWINGS

FIG. 4 is a schematic illustration of a typical truss response and deflection due to internal stresses from expansion or the like;

FIG. 14b is a bottom perspective view of the bottom half of the yoke assembly shown in FIG. 14a;

FIG. 15a is atop perspective view of the uplift slide bearing plate assembly showing in FIG. 14a;

FIG. 15b is a sectional view of the uplift slide assembly taken along line 15b-15b in FIGS. 15a;

DESCRIPTION OF THE PREFERRED EMBODIMENTS

Figure 2:
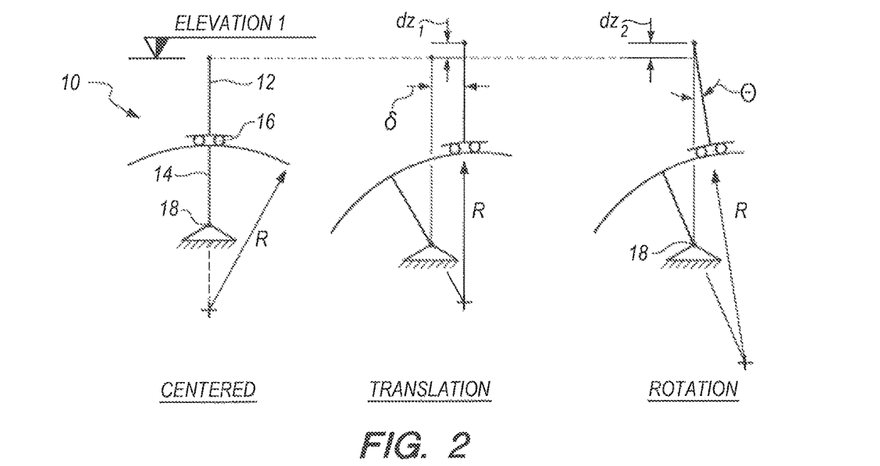
FIG. 2 is a schematic view similar to FIG. 1, showing the use of a non-linear arcuate, generally convex, bearing according to the present invention in a support carriage for an overhead crane or moveable roof structure and the like and illustrating the motions in such a structure.

Referring now to the drawings in detail and initially to FIG. 2, a support carriage 10 is schematically illustrated having an upper carriage body member 12 and a lower carriage body member 14. Upper carriage body member 12 is connected to and supports one end (not shown) of an overhead crane or movable roof truss and the like and lower carriage body member 14 is mounted by wheels on a support rail or other support 18 which allows the carriage to be moved a direction transverse to the span of the truss (into and out of the page) and thus move the crane element or truss. A non-linear curved bearing 16 is provided on carriage 10 to allow translation of the upper carriage body member 12 on the lower carriage body member 14 in an arcuate path, to the right or left in the drawing, to release translational stress in the supported structure. Because of its curvature the bearing allows this movement along an arcuate curve to also release rotational stress. As described hereinafter the carriage bodies members have complementary arcuate structures defining the non linear bearing and between which a low friction bearing material, such as a sheet or sheets of PTFE, is provided. In this illustrated embodiment the complementary surfaces are convex, each having a radius of curvature R.

As also seen in FIG. 2 when the carriage 10 moves in translation it moves in an arcuate path, resulting in vertical deflection of the upper carriage as compared to the conventional linear bearing shown in FIG. 1 and described above. The change in elevation for both translation and rotation are not necessarily equal. Therefore using an arcuate non-linear bearing allows the design engineer to select a radius of curvature as best suited for a particular project as the curved bearing, allows the deflection dimension dz to be controlled.

Figure 3:
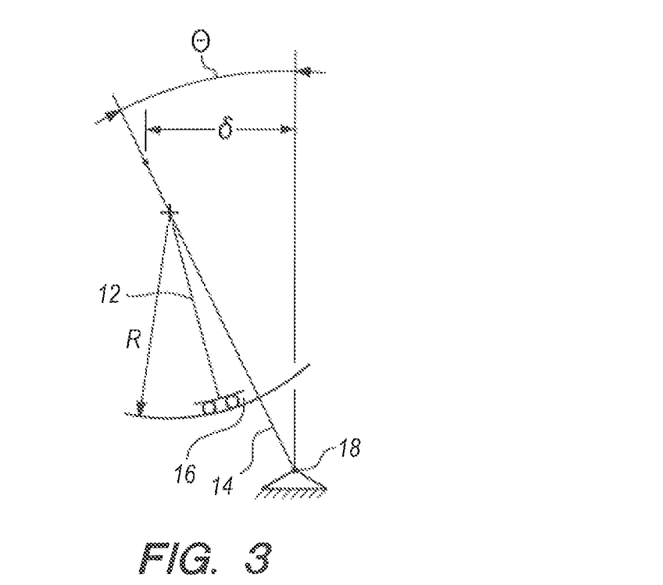
FIG. 3 is a schematic illustration similar to FIG. 2 of an alternative concave shaped non-linear bearing.

FIG. 3 is a schematic illustration similar to FIG. 2 showing an alternative non-linear bearing using a concave arcuate bearing. As seen therein the upper and lower carriage body members 12 and 14 have complementary concave surfaces separated by the low friction surface member or pad 16 which allows relative movement, in the arcuate path, between the carriage body members. The concave form is shown in FIG. 3 in a displaced position that shows both translation and rotation. This forth of bearing may be used for the purpose of achieving different goals. The two forms (of FIGS. 2 and 3) are believed to be equivalent in the sense that both forms use a non-linear bearing that follows the path of a circular arc, however the reversed direction of curvature to concave causes a different response (i.e., different kinematic relations) as would be understood by those skilled in the art.

While both the convex and concave forms of the non-linear bearing allow for translation and rotation to occur simultaneously, because the kinematics are different, the resulting forces and general response are different. Also, both forms include the parameter for the radius of the non-linear bearing (R), which can be selected by the designer, to meet the needs of any particular structure.

Figure 4:
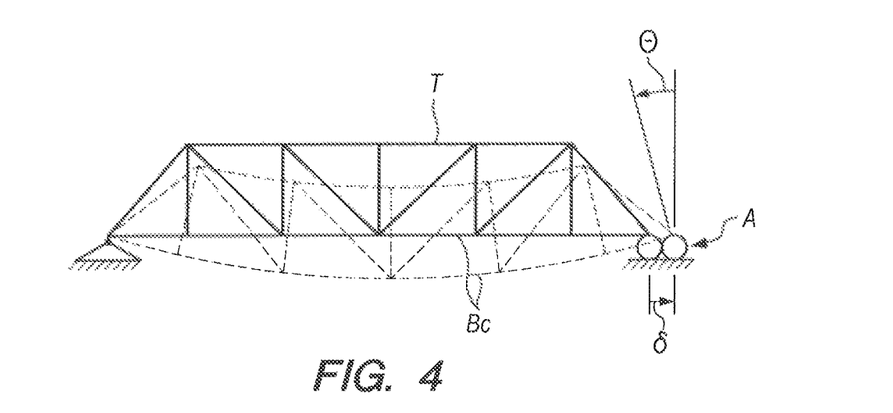

FIG. 4 illustrates schematically the direction of rotation and translation of a simply supported truss, such as a roof truss or overhead crane. As seen therein as a truss T expands due to loads on the truss or by thermal expansion, the bottom chord BC moves downward and outward (illustrated in dotted lines) and the end A, supported by the release mechanism, rotates in one direction as it translates left to right. Upward deflection causes the rotation in the opposite direction.

Because the rotational and translation motions are related, the use of the non-linear bearing allows the designer to select a radius of curvature that best suits the desired objectives of the structure. For example, it may be desirable to align the rotation and displacements of the non-linear bearing such that the truss is most able to respond as the idealization shown in FIG. 4. Conversely, it may be desirable to design the non-linear bearing to offer resistance to this rotation in order to minimize deflections and mid-span weight. Consideration of the geometry allows the designer to also control the increments of elevation change ($dz_1$ and $dz_2$ shown in FIG. 2) which is not possible with the linear bearing. The non-linear bearing presented here allows the designer to select the direction and radius of curvature that best meet the goals of a particular project.

Figure 5:
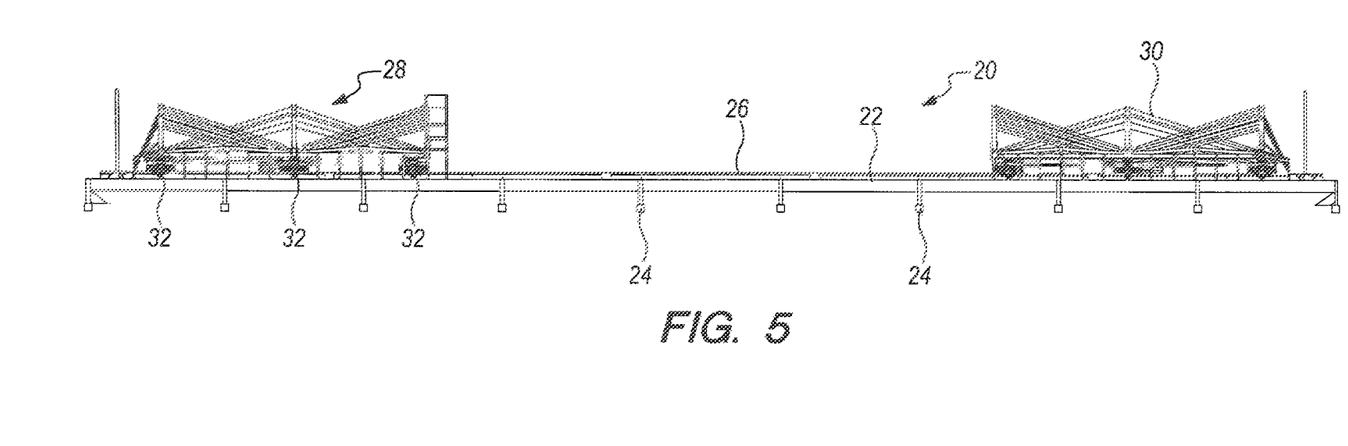
FIG. 5 is a schematic elevational view of a retractable roof structure supported on movable carriages for moving the roof members between open and closed positions.
Figure 6:
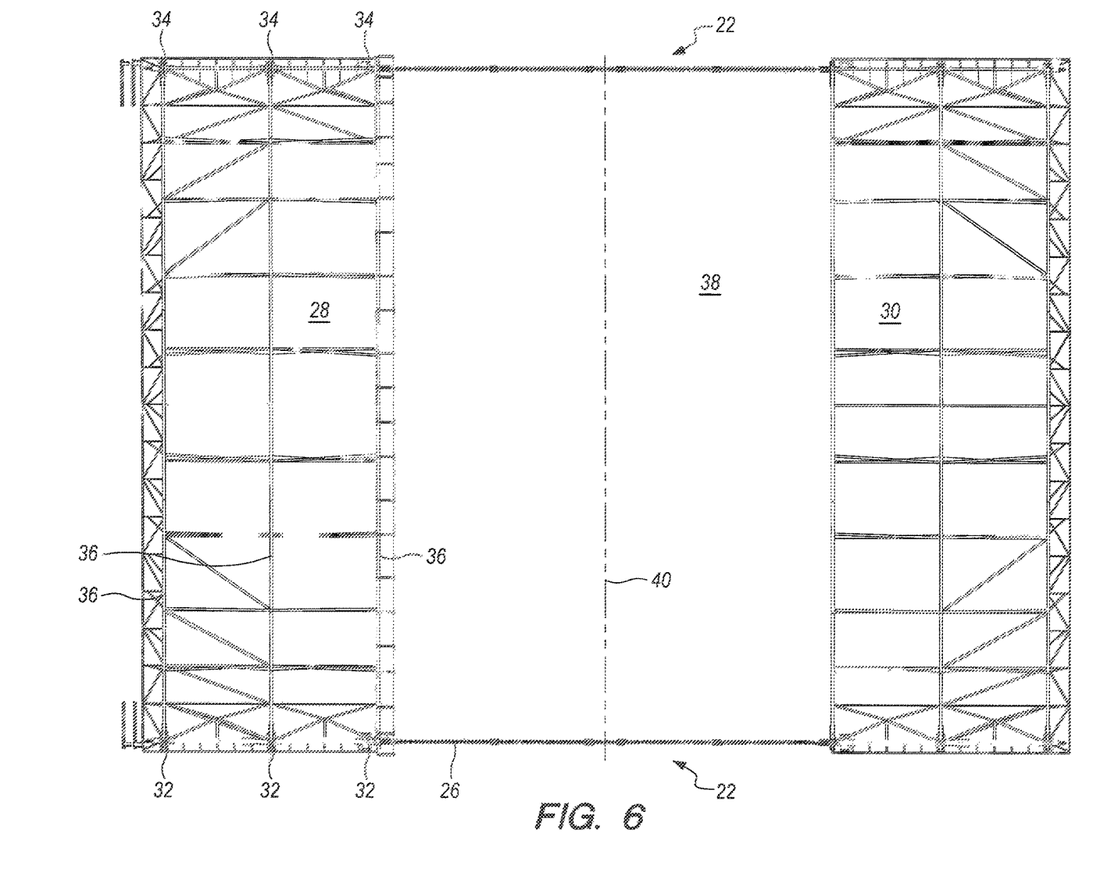
FIG. 6 is a plan view of the roof structure shown in FIG. 5.

FIGS. 5 and 6 illustrate a retractable roof structure 20 consisting of a pair of horizontal support beams (or trusses) 22 mounted on the upper portion of a stadium or other building structure 24. The support beams 22 in the illustrative embodiment have transport rails 26 mounted thereon which in turn support two retractable roof sections 28, 30. The roof structures are supported on the rails at their opposite ends by a plurality of bogies or wheeled carriages 32, 34.

Figure 7:
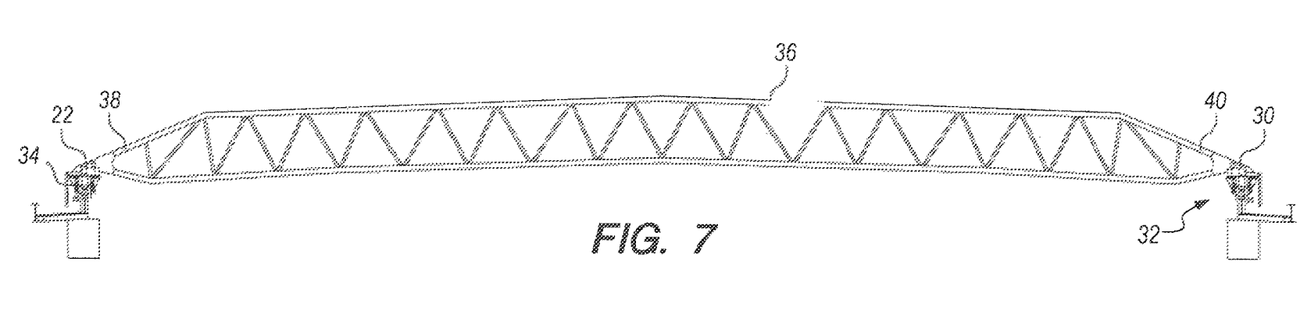
FIG. 7 is an elevational view of a roof support truss for the roof shown in FIGS. 5 and 6 taken facing the span of the truss.

As seen in FIG. 6 the roof sections 28,30 are each formed from a plurality of trusses 36, one of which is shown in FIG. 7 in side view. The wheeled carriages 34 along one side of the building are guided carriages. That is, they are rigidly secured to the adjacent end of its associated truss 36. The carriage wheels allow the carriages to move along the rail during opening and closing. The other set of carriages 32, on the other side of the trusses, are referred to as released carriages as these carriages include the non-linear release bearing of the invention which release stresses in the trusses that would cause them to expand or contract. The carriages 32 are also wheeled carriages so both ends of the trusses can be moved long their rails 26 simultaneously to safely open and close the roof In the illustrated embodying the movable roof structures 28, 30 overlie fixed roof sections (not shown) beneath them in the closed position, leaving the center area 38 open. When the retractable roof sections are moved to their closed positions the sections meet in the middle of the area 38, illustrated by the dotted line 40, to and close the roof entirely.

The roof sections 28, 30 can be moved in any convenient manner known to those skilled in the art. One such system utilizes a cable and winching system secured to the carriages to pull them into and out of their opened and closed positions. Another such system would consist of motors on the carriages directly driving the carriage wheels.

FIG. 7 illustrates a typical roof truss 36 for the retractable roof on a sports stadium shown in FIGS. 5 and 6. The trusses 36 each span a large distance and are supported on wheeled support carriages 32, 34 at their opposed ends as described above. These support carriages or bogies are typically supported on rails 26 mounted on the stadium side walls or other structures adjacent the stadium. The carriages 34 along one side of the roof sections 28, 30 are rigidly secured to the adjacent end 38 of truss 36 in any convenient manner, e.g., a fixed joint, which does not allow for movement of the truss transverse the rail, i.e. in the length or span direction of the truss. The carriages 32 along the other side of the roof sections 28, 30 (referred to herein as released carriages) are secured to the other end 40 of trusses 36 and contain the non-linear release mechanism of the present invention.

Figure 8:
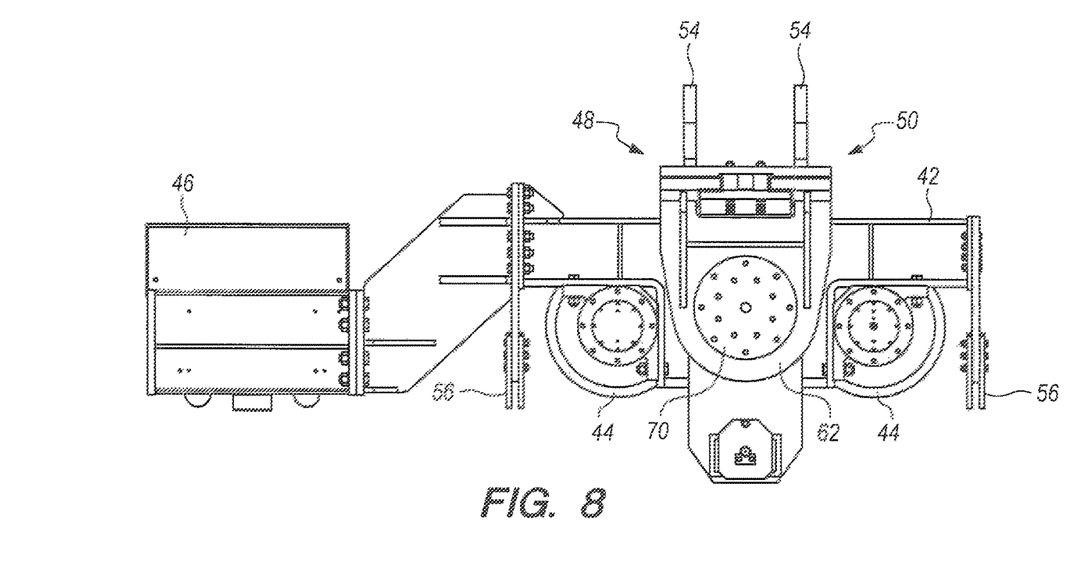
FIG. 8 is a side elevation view of a release carriage used in the roof of FIGS. 5 and 6, with a brake unit.

FIG. 8 illustrates a released carriage 32 including the non-linear release mechanism of the present invention. Carriage 32 includes a main frame structure 42 on which two or more wheels 44 are rotatably mounted for movement along the rails in the conventional manner. The carriage may support a brake mechanism in a housing 46 mounted at one end to stop movement of the carriage when needed and lock the carriage in place when not moving.

The carriage frame 42 is connected to the end 40 of the truss (not shown in FIG. 8) through a yoke assembly 48 which includes the non-linear release bearing assembly 50 that allows the end 40 of the truss to move relative to the carriage in a non-linear curved path to release stresses in the truss.

Figure 9:
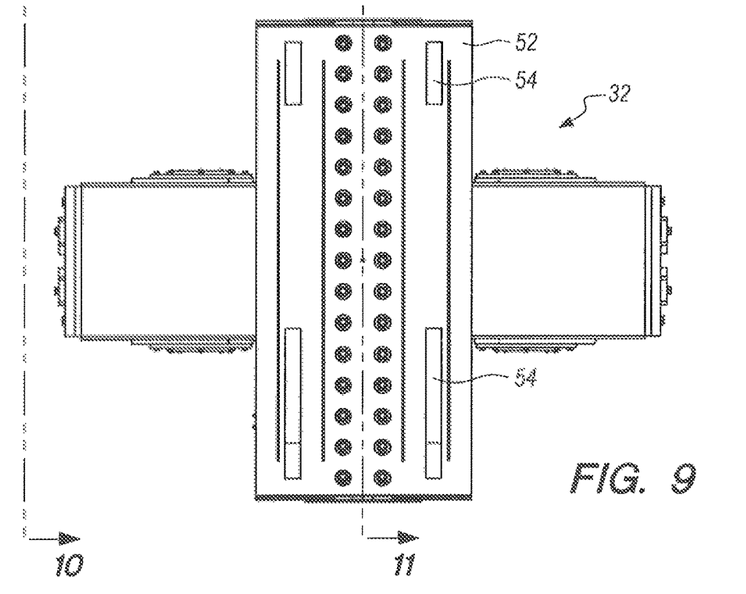
FIG. 9 is a top plain view of the carriage shown in FIG. 8, without a brake unit.

FIG. 9 is a top view of the carriage 32. As seen in FIGS. 8 and 9 a top bearing mounting plate 52 of the release bearing assembly has a series of brackets 54 welded to it which are used to secure the plate to the truss end 40.

At the ends of the carriage frame 42 the carriage is provided with conventional uplift preventers, which are metal plates 56 (see also FIGS. 10 and 11) having openings 57 in their lower ends that are shaped to be generally complementary to the head of rail 26 to closely surround the head. The purpose of this uplift preventers is to limit upward movement of the carriage relative to the rail under high wind conditions.

Figure 10:
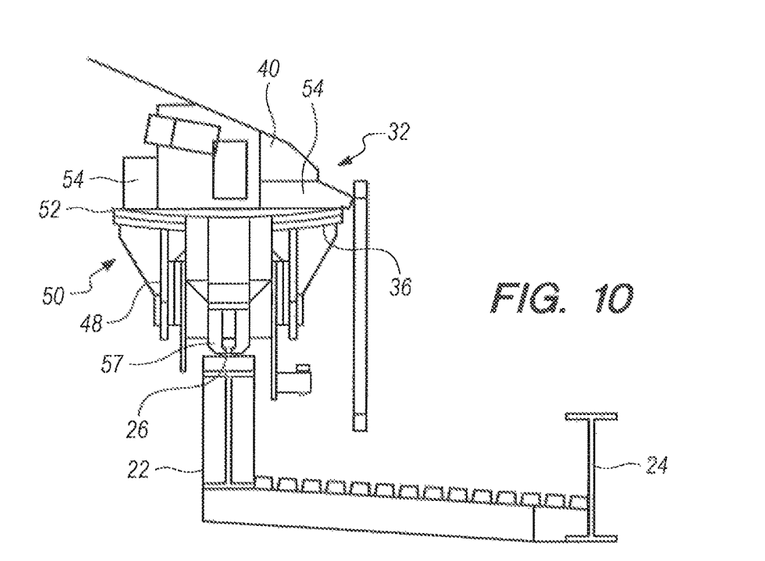
FIG. 10 is an elevational view in the direction of travel of one end of the carriage as shown in FIG. 9 taken along the line 10-10 in FIG. 9, and illustrating the carriage seated on the support rail along which it travels.

Referring now to FIG. 10, the carriage 32 is illustrated in end view on the rail 26 which is supported on the beam 22, which is in turn connected and supported in any convenient manner on the building structure 24 or other independent structure. As seen therein the upper bearing mounting plate 52 of release bearing assembly 50 is curved in this embodiment concavely and the brackets 54 secure the bearing mounting plate 50 to the end 40 of the associated truss.

Figure 11:
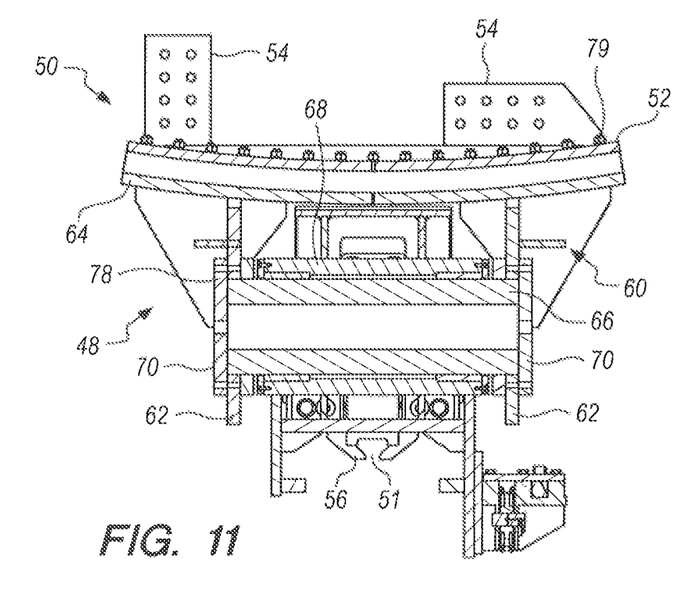
FIG. 11 is a sectional view of the carriage yoke assembly and non-linear release bearing taken along lines 11-11 in FIG. 9.
Figure 12:
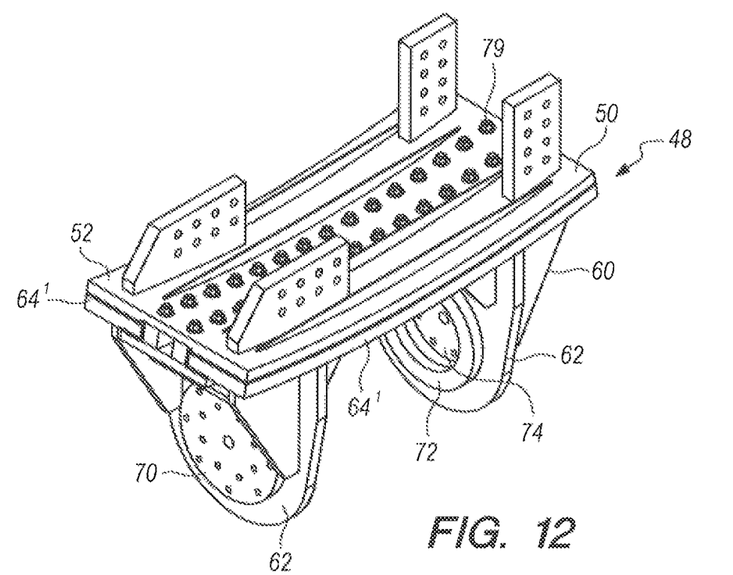
FIG. 12 is a perspective view of the carriage yoke assembly and bearing mounting plates of the carriage shown in FIGS. 8-11.

The yoke assembly 48 is illustrated in cross-section in FIG. 11 and in perspective in FIG. 12. As seen therein the yoke assembly includes the bearing assembly 50, its previously described tapper bearing mounting plate 52 and its brackets 54 and a lower yoke member 60. The yoke member is formed of two lower vertical pin support plates 62 secured at their upper end to a lower curved bearing mounting plate 64 of the bearing assembly 50. That bearing mounting plate is, in this embodiment, formed from lower two spaced apart plates, 64' (see FIG. 14a) having the same radius of curvature as the upper bearing mounting plate 52.

Lower yoke member 60 is connected to the carriage frame 42 through the use of a cylindrical pin 66 (see FIG. 13) that is positioned in a hollow cylindrical bearing 68 mounted in frame 42. Pin 66 is held in bearing 68 by pin keeper plates 70. As seen in FIG. 12 spherical yoke pin spacer plates 72 are bolted to the inner faces of support plates 62 around a complementary opening in the pin support plates 62. These pin spacer plates define central cylindrical ports 74 that receive the ends of the pin 66 (see FIG. 11). The pin keeper plates are then bolted to the ends of the pin, thereby retaining the pin in the bearing. Thus the pin 66 allows some degree of pivotal movement of the carriage relative to the yoke about an axis perpendicular to the direction of travel of the carriage.

Figures 13, 14A:
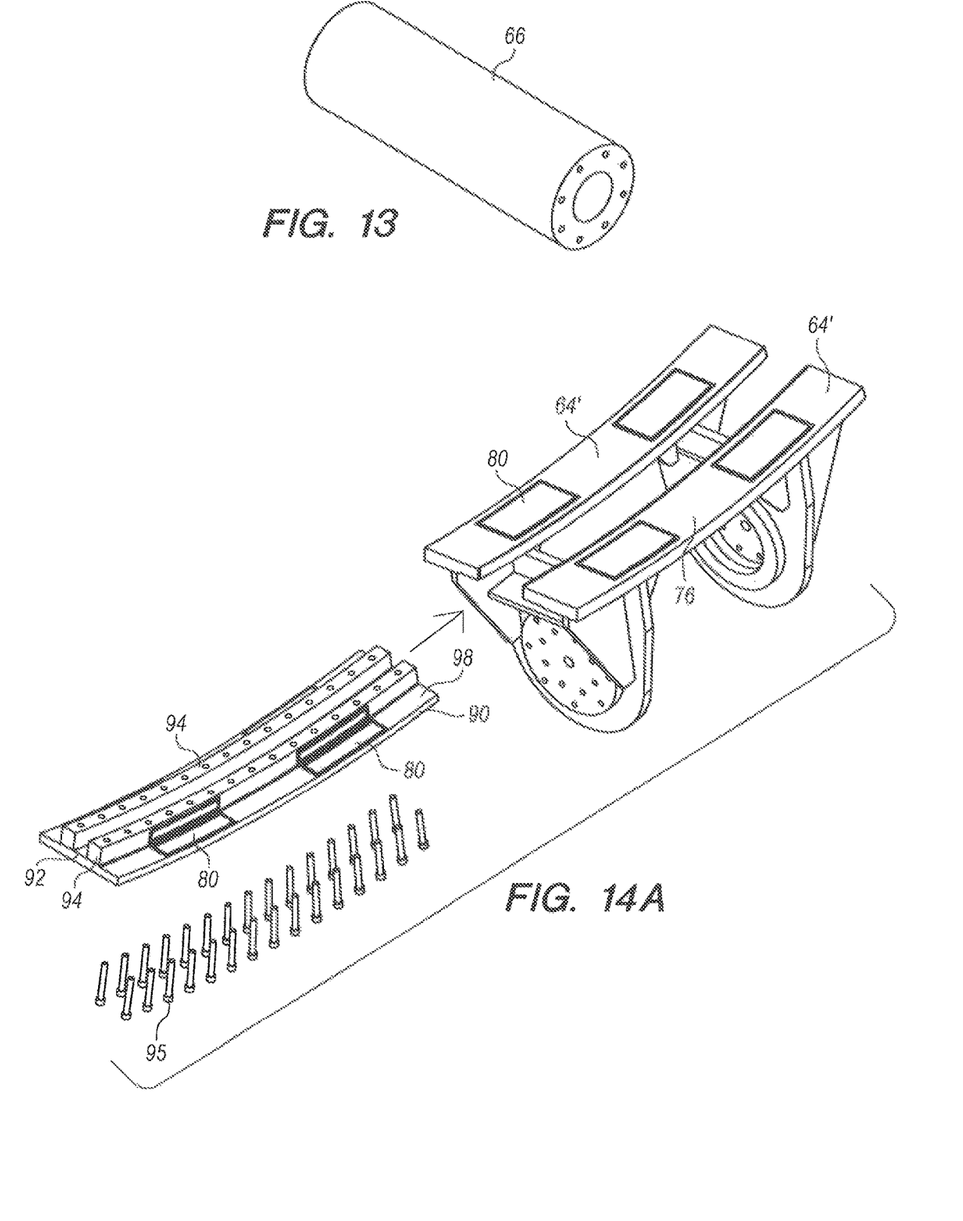
FIG. 13 is a perspective view of the fixed pin used to secure the yoke assembly to the frame of the carriage.
FIG. 14a is an exploded perspective view of the bottom half of the yoke assembly, including the lower bearing mounting plates of the curved non-linear slide bearing and an uplift slide assembly which is inserted into the bottom half of the yoke assembly.
Figure 16A:
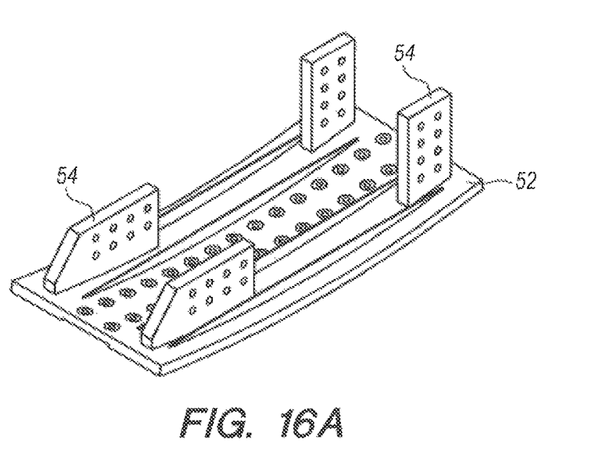
FIG. 16a is a perspective view of the top of the upper bearing mounting plates of the curved non-linear slide bearing.
Figure 16B:
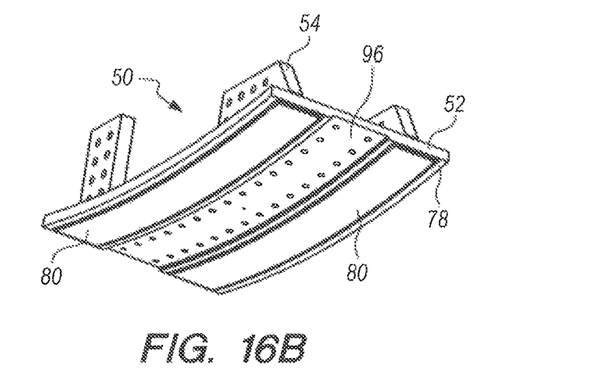
FIG. 16b is a perspective view from the bottom of the upper bearing mounting plate of the curved non-linear slide bearing.
Figure 16C:
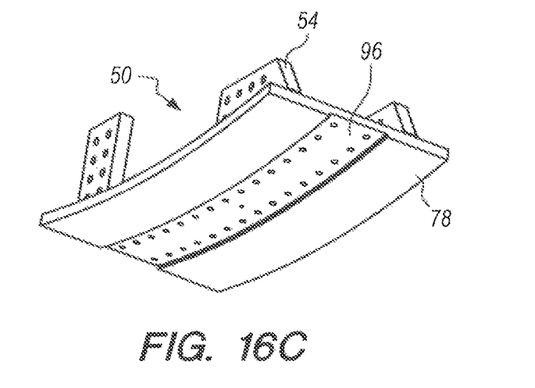
FIG. 16e is a bottom view similar to FIG. 16b but with the slide bearing pads removed.
Figure 17:
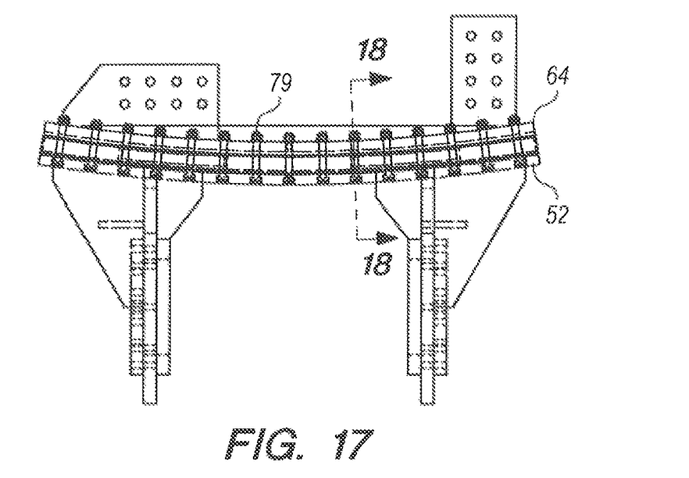
FIG. 17 is a side view of the assembled carriage yoke non-linear slide bearing and the uplift slide assembly.

As seen in FIGS. 14a, 16 and 17, the surfaces 76 of lower bearing mounting plate 64 and the surfaces 78 of upper bearing mounting plate 52 which face each other when the release bearing assembly is assembled and have slide bearing material 80 secured thereto in any convenient manner. This material is typically PFTE, although other materials can be used as well. As a result when the surfaces 76, 78 of the bearing mounting plates are positioned face to face the upper bearing mounting plate can slide relative to the lower bearing mounting plates 64 in an arcuate path as discussed above.

In order to prevent the surfaces 76 and 78 from sliding relative to each other in the direction of movement of the carriage and to prevent the bearing mounting plates from separating from each other vertically an uplift/lateral slide assembly is provided. This assembly, as seen in FIGS. 14a and 15a-c, consists of an arcuate plate 90, of the same radius of curvature as the bearing mounting plates, which has a central raised portion 92. This plate is dimensioned to fit in the yoke 60 beneath the bearing mounting plates 64. (See FIGS. 14a and 14b.)

Figure 14B:
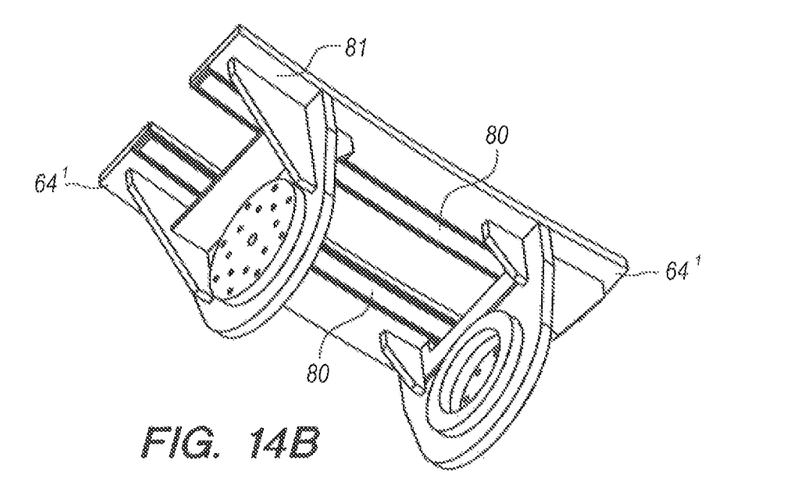
Figure 15A:
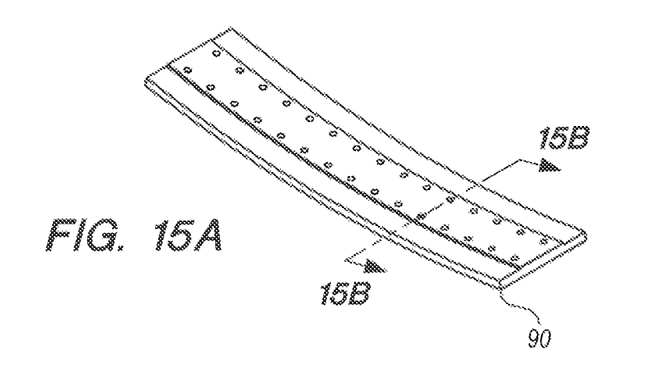
Figure 15B:
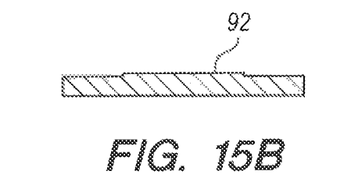
Figure 15C:
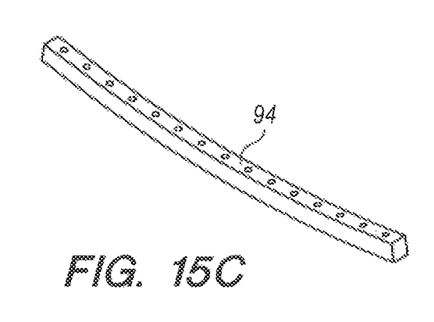
FIG. 15c is a perspective view of one of the uplift plate's lateral slide bearing bars.
Figure 18:
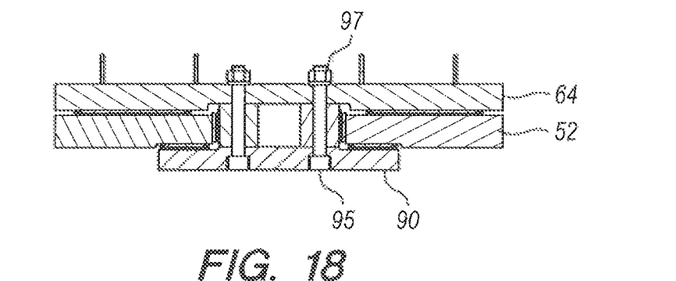
FIG. 18 is a sectional view taken along line 18-18 of FIG. 17.

Two arcuate spacers bars 94 are positioned on the central ridge 92 of plate 90 and bolted through plate 90 (by bolts 95) to the central portion 96 of the lower surface 78 of upper bearing mounting plate 52 to which they are secured by nuts 79 (FIGS. 12 and 17). The edges 98 of plate 90 and the sides of the spacers bars 94 arc preferably covered in whole or in part by slide bearing material strips 80 as is the bottom surface 81 of lower bearing mounting, plates 64 adjacent the space between them, as seen in FIG. 14b. As a result the uplift/lateral slide bearing plate 90 is secured to the upper bearing mounting plate 52 to move with the upper bearing mounting plate relative to the lower bearing mounting plate while also preventing the upper plate 52 from moving away from lower bearing mounting plate 64 vertically or in the direction of travel of the carriage. (See FIGS. 17 and 18).

Figure 19:
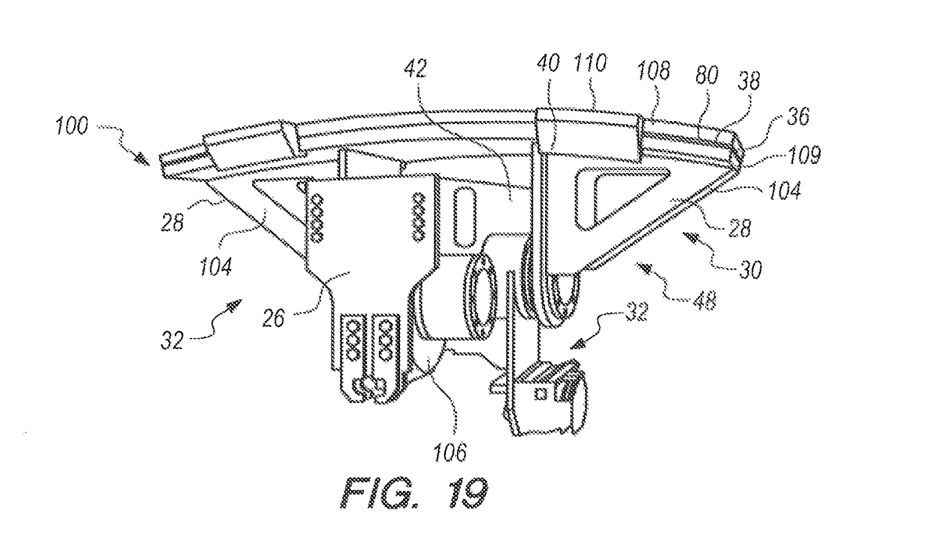
FIG. 19 is a schematic view of another embodiment of the invention showing the use of a concave rather than convex non-linear slide bearing.

FIG. 19 illustrates an embodiment of a support carriage 32 of the present invention using a convex non-linear release mechanism 100. As seen therein the bogie 32 has an upper bearing mounting plate 108 which is connected to the truss 40 by brackets 54 (not shown) as described above. The carriage or bogie 32 also has a lower yoke assembly 48, corresponding to the previously described yoke assembly mounted on a wheel mounting carriage frame 42 which includes bearing plate support wings 104. The carriage 32 has one or more wheels 106 rotatably mounted thereon which ride on the previously mentioned rails. These wheels roll to permit movement of the movable structure.

Wings 104 support a lower convex bearing mounting plate 109 which is complementary to the shape of the upper plate 108.

A low friction layer or layers 80 of slide bearing material (PTFE or other material) is located between plates 108 and 109 to permit sliding motion between the plates in the direction transverse to the direction of motion of the bogies.

Bearing blocks 110 mounted on the edges of upper plate 108, on each side, prevent relative movement of the bearing mounting plates in the direction of movement of the bogie and have lower lips 112 which prevent the bearing mounting plates from separating vertically.

Although the invention has been described herein with reference to specific embodiments shown in the drawings, it is to be understood that the invention is riot limited to such precise embodiments and that various changes and modifications may be affected therein without departing from the scope or spirit of the invention.

What is claimed is:

1. A release mechanism for a transport carriage used to move an elongated beam or truss which spans a large space and which can move reciprocally in a first direction with its transport carriage over said space, said release mechanism comprising a non-linear bearing having an upper bearing support member and a lower bearing support member; said bearing support members having generally complementary arcuate surfaces and at least one layer of a low friction material on one of the bearing support members located between the facing complementary surfaces of the bearing support members, one of said bearing support members being located to be connected to said beam or truss and the other bearing support member being connected to the transport carriage used to move the beam or truss in said first direction, transverse to its span, and said including means for allowing said one bearing support member connected to said beam or truss to move relative to the other bearing support member connected to the transport carriage in an arcuate path in the direction of elongation of the span of the beam or truss and transverse to direction of movement of the beam or truss with the carriage in said first direction of movement to control lateral and rotational stresses in said beam or truss.

2. The release mechanism of claim 1 wherein said bearing support members are of uniform curvature.

3. The release mechanism of claim 1 wherein said bearing support members are concave.

4. The release mechanism of claim 1 wherein said bearing support members are convex.

5. The release mechanism of claim 2 wherein said bearing support members are concave.

6. The release mechanism of claim 2 wherein said bearing support members are convex.

7. A large building having a large space therein and including at least one structural member spanning said space; said structural member having opposed ends; means for movably supporting said opposed ends across the space, means for moving said structural member from one position to another in the building by moving said supporting means reciprocally in a first direction transverse to the span of the structural member between its opposed ends; said supporting means including a non-linear bearing member connected adjacent one end of said structural member, said non-linear bearing including first and second complementary shaped arcuate elements and means for allowing one of the complementary arcuate elements to move relative to the other of the arcuate elements in an arcuate path in the direction of the span of the structural member between its opposed ends and generally transverse to the first direction of movement of said structural member to control lateral and rotational stresses in the structural member.

8. A stadium having a retractable roof comprising:
an open area, a moveable roof panel mounted for reciprocal movement in a first path of travel relative to said open area to cover at least part thereof; and means for moving said roof panel in relation to said open space in said first path of travel from a first to a second position, said moving means including means for supporting said roof panel in the stadium at two spaced locations for such movement and wherein at one of those locations the moving means includes a non-linear bearing assembly means for allowing one part of said supporting means at least one of said spaced locations to move relative to another part of the supporting means in an arcuate path that is generally transverse to the direction of movement of the roof panel in said path of travel to release lateral and rotational stress in the panel.

9. A system for supporting a large overhead structural member having first and second longitudinally spaced ends for movement along a defined path of travel over a large space comprising first and second mobile carriages for the structural member located adjacent the respective first and second ends thereof which are constructed and arranged to transport the structural member between predetermined positions over the space in said path of travel, one of said carriages being fixed to said first end of the structural member and the other of said carriages being connected to the structural member adjacent said second end thereof through a release mechanism, said release mechanism including means for permitting said second end of the structural member to move relative to said carriage fixed to the second end of the structural member in an arcuate path that is not in the direction of movement of the structural member between said predetermined positions in said defined path of travel to control lateral and rotational stresses in the structural member.

10. The system as defined in claim 9 wherein said release mechanism comprises a first bearing mounting plate connected to said other carriage connected adjacent said second end of the structural member and a second bearing mounting plate connected to said structural member and moveably engaged with said first bearing mounting plate; said bearing plates having generally complementary arcuate bearing surfaces facing each other, and means for constraining said second bearing mounting plate to movement in an arcuate path relative to said first bearing mounting plate that is not in the direction of movement of the structural member between said predetermined positions.

11. The system as defined in claim 10 wherein said bearing mounting plates have slide bearings secured to their arcuate bearing surfaces.

12. The system as defined in claim 10 wherein said first bearing mounting plate has a slot formed therein at an angle to the direction of movement of the structural member, and said constraining means comprises an uplift/release bearing plate engaged with the first bearing plate on the side thereof opposite the second bearing plate and being secured to said second bearing plate through said slot to constrain movement of said second bearing mounting plate relative to said first bearing mounting plate in both a vertical direction and in the direction of travel of the structural member.

13. The system as defined in claim 10 wherein said first and second bearing mounting plates have generally vertically aligned edge portions and said constraining means comprises a bracket mounted on the second bearing mounting plate adjacent said edges and having a lip portion extending to a point below and under the edge of said first bearing mounting plate to constrain movement of said second bearing mounting plate relative said first bearing mounting plate in the vertical direction and in the direction of movement of the structural member.

14. A non-linear support for allowing relative movement between first and second structural members in order to control stress in one of the structural members, wherein said first and second structural members are constructed, and arranged to allow translational movement of one of the structural members in a predetermined path of travel, between at least first and second positions, said non-linear support comprising a first bearing plate connected to one of said structural members and a second bearing plate connected to the other of said structural members, said bearing plates having generally complementary arcuate surfaces facing and operatively engaged with each other for sliding movement of one plate relative to the other in a predetermined arcuate direction generally transverse to said predetermined path of travel of said one structural members to control lateral and rotational stress in said one of the structural members.

15. The non-linear bearing support as defined in claim 14 wherein the bearing plates are of uniform curvature.

16. The non-linear bearing support as defined in claim 14 wherein the bearing plates are concave relative to said one of the structural members.

17. The non-linear bearing support as defined in claim 14 wherein the bearing plates are convex relative to said one of the structural members.

18. The non-linear bearing support as defined in claim 15 wherein said bearing plates have slide bearing material secured to their opposed facing surfaces.

19. The non-linear bearing support as defined in claims 14 and 18 including means for constraining said one bearing plate to movement in an arcuate path in a single arcuate reciprocating direction relative to the other of the bearing plates and generally transverse to said predetermined path of travel.

20. The non-linear bearing support as defined in claim 19 wherein said first bearing plate has a slot formed therein extending in said predetermined direction, and said constraining means comprises an uplift/release bearing plate engaged with said first bearing plate on the side thereof that does not face said second bearing plates and being secured to said second bearing plate through said slot to constrain movement of said record bearing plate relative to said first bearing plate in both vertical direction and in said arcuate reciprocating direction.

21. The non-linear bearing support system as defined in claim 19 wherein said first and second bearing plates have generally vertically aligned edge portions and said constraining means comprises a bracket mounted on the second bearing plate adjacent its edges and having a lip portion extending to a point below and under the edge of said first bearing plate to constrain movement of said second bearing plate relative said first bearing mounting plate in the vertical direction and in said arcuate reciprocating direction.

22. A large building as defined in claim 7 wherein said complementary arcuate elements of the non-linear bearing are of uniform curvature.

23. A large building as defined in claim 7 wherein said complementary arcuate elements are concave when viewed in elevation and generally extend in alignment with or parallel to the span of the structural member.

24. A large building as defined in claim 7 wherein said complementary arcuate elements are convex when viewed in elevation and generally extend in alignment with or parallel to the span of the structural member.

25. A large building as defined in claim 7 including at least one layer of a low friction material on one of said arcuate elements located to engage and slide on the complementary surface of the other arcuate element.

26. A stadium as defined in claim 8 wherein said non-linear bearing means includes first and second complementary arcuate bearing elements respectively connected to said one part of the supporting means and to said another part of the supporting means and means for connecting said arcuate bearing members to allow said relative movement of said pacts in said arcuate path that is generally transverse to the direction of movement of the roof panel in said first path of travel.

27. A stadium as defined in claim 26 wherein said arcuate bearing members are concave when viewed in elevation and generally extend transversely to the direction of the roof panel in said feed path of travel.

28. A stadium as defined in claim 26 wherein said arcuate bearing members are convex when viewed in elevation and generally extend transversely to the direction of the roof panel in said feed path of travel.

29. The system as defined in claim 10 wherein said means for constraining said second bearing mounting plate to movement in an arcuate path constrains said movement to a direction that is generally transverse to the direction of movement of the structural member between said predetermined positions.

30. The system as defined in claim 11 wherein said slide bearings are formed of low friction material.

31. The non-linear bearing as defined in claim 18 wherein said slide bearing material is a low friction material.

* * * * *